Oct. 31, 1961     C. VAN DER LELY     3,006,427
THREE WHEELED TRACTOR WITH ADJUSTABLE WHEEL BASE
Filed Feb. 8, 1957     2 Sheets-Sheet 1
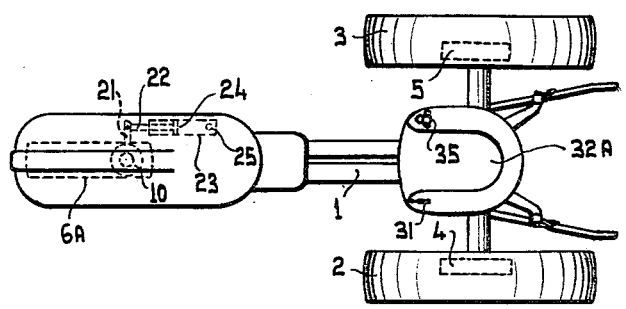

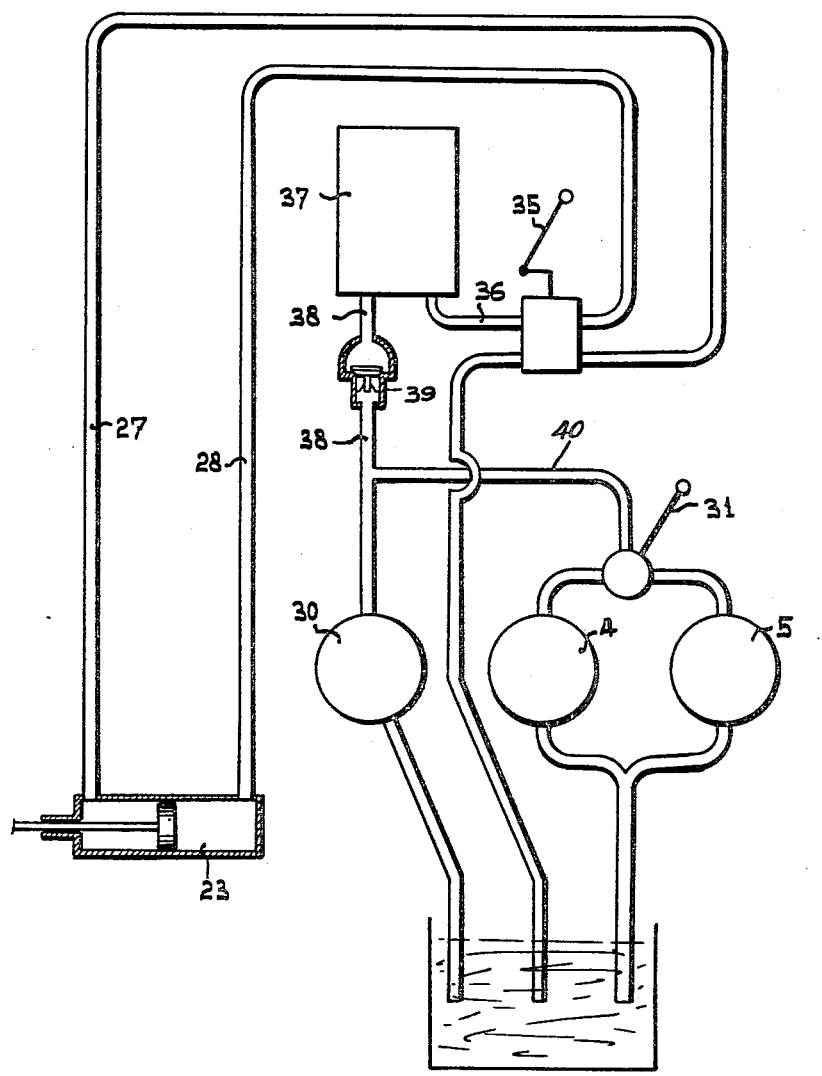

United States Patent Office 3,006,427
Patented Oct. 31, 1961

3,006,427
THREE WHEELED TRACTOR WITH
ADJUSTABLE WHEEL BASE
Cornelis van der Lely, Maasland, Netherlands
(7 Bruschrain, Zug, Switzerland)
Filed Feb. 8, 1957, Ser. No. 639,081
Claims priority, application Netherlands Feb. 9, 1956
6 Claims. (Cl. 180—27)

The invention relates to tractors of the type having one or more steerable wheels and an adjusting device for the adjustment of the positions of these steerable wheels in accordance with the position of a control-member to be operated by a driver, this adjusting device comprising a hydraulic servo-device. Tractors of this kind are generally known and are provided with a steering wheel, on which the driver need exert only a comparatively slight force, if a liquid under pressure is available, but by means of which the driver is capable of steering even if there is no liquid under pressure available, in which case, however, the driver has to exert a considerable force on the steering wheel. It will be appreciated that steering devices of this kind are much more costly than the conventional, mechanical steering devices.

An object of the invention is to provide a tractor with a steering device, which can be operated by a slight force and which is, moreover, simpler than a completely mechanical steering device.

The invention is based on the recognition of the fact that the aforesaid advantage offered by a steering device with a servo-operation, which device, in the absence of a liquid under pressure can be used at the same time as a completely mechanical steering device, is only seldom utilized fully and that, if this direct mechanical controllability is abandoned, there is even the possibility of dispensing with the steering wheel and the steering column and of arranging a control-device at an area which is not a source of trouble to the movements and the outlook of the driver. In accordance with the invention the adjusting device is constructed in a manner such that under all operation conditions the energy required for the adjustment of the positions of the steerable wheels is supplied only by the servo-device. This construction is particularly important for tractors and especially for agricultural tractors, since, as a rule, these vehicles perform their work in severe conditions of the ground. Therefore, the forces to be exerted on the steering wheel of a mechanical steering device may be very great, whilst these vehicles require furthermore a good visibility for the driver. The control-device to be operated by the driver of the tractor is preferably arranged at the side of the driver on his seat. It is very useful to construct this member in the form of a handle movable to the left and to the right.

According to a favorable aspect of the tractor according to the invention a steerable wheel together with its pivotal shaft is rotatable through 180° about a substantially vertical reversing shaft, the latter shaft crossing the axle of the steerable wheel, at least if the latter is in the central position. This yields the advantage that the distance of this wheel from the shafts of the driven wheels varies appreciably, when the wheel is turned through 180° around the reversing shaft, so that the tractor may be used at will with a larger or a smaller wheel base, the smaller wheel base being preferred when the steerable wheel moves behind the driven wheels during backward driving. A further measure which facilitates driving backwards and which can be combined efficiently with the first-mentioned measure consists in that the driver's seat together with the manual control-members for the tractor arranged on this seat is rendered rotatable through 180° around a vertical axis.

The invention will be explained with reference to the drawing, which shows a preferred embodiment.

FIG. 1 is a plan view of one embodiment of a tractor according to the invention.

FIG. 2 is a side view of the same tractor in a different operational position.

FIG. 3 shows, on an enlarged scale, a plan view of part of the tractor shown in FIGS. 1 and 2.

FIG. 4 is a plan view of part of a tractor, which is a variant of the tractor shown in the FIGS. 1 to 3.

FIG. 5 shows the pipe system of the servo-device.

Referring to FIG. 1, the tractor comprises a chassis or support 1, which is supported by two unsteerable rear wheels 2 and 3, which are spaced transversely of the direction of travel of the tractor and which are driven by hydraulic motors 4 and 5, and by a steerable wheel 6 (see FIG. 2), of which the axle 7 is connected by way of a rod 8 with a vertical shaft 9. The wheel 6, positioned midway between wheels 2 and 3, is shown in FIG. 1 in a different position, which is designated by reference character 6A. The wheel 6 can be moved into this position, since the shaft 9 is rotatable in a sleeve 10. However, the rotatability can be locked in different relative positions of the shaft 9 and the sleeve 10 (see FIG. 3) by means of a stud 11, which is adapted to slide in a channel 12 in the sleeve 10 and which fits in each of four recesses 13, 14, 15 and 16 of the shaft 9. The stud 11 is connected with a piston 17, which is adapted to move in a cylinder 18. A spring 19 normally urges the stud 11 in the direction of the shaft 9. By feeding liquid under pressure through a duct 20 to the cylinder 18, the stud 11 may be caused to move against the spring 19. If the pressure on the liquid is removed, the stud 11 will fall into one of the recesses 13 to 16 as soon as one of them lies opposite the channel 12.

It is evident from FIG. 1 that the sleeve 10 is provided with an arm 21, with which a piston rod 22 is pivoted. The piston rod 22 supports a piston 24, which is movable in a cylinder 23. With the aid of a vertical stud 25 the cylinder 23 is articulated to the chassis 1, while the sleeve 10 itself is rotatable about the center line 26 of the shaft 9, which is at the same time the center line of the sleeve 10, with respect to the chassis 1. This rotation takes place, viewed from above, to the right or to the left by supplying liquid under pressure to the cylinder 23, by way of the duct 27 or the duct 28 respectively (see FIG. 5).

The frame 1 supports a combustion engine 29 and a liquid pump 30, which is driven by this engine. The liquid on which the pump 30 exerts a pressure may be fed via a conduit 40 by the driver of the tractor to the motors 4 and 5 in order to start the tractor. The control-members for this operation, for instance the handle 31, are arranged on the driver's seat 32 (see FIG. 2), which is shown in FIG. 1 in a different position (32A). The seat 32 is provided with a vertical shaft 33, which is rotatable in a sleeve 34. The seat is furthermore provided with a handle 35, which controls the supply of liquid under pressure from the pump 30 to the ducts 27 and 28. When the handle 35 is moved or turned to the right or to the left, liquid is fed under pressure to the duct 27 or the duct 28 respectively, so that the steerable wheel 6 moves to the right or to the left respectively (viewed from above). The liquid required for the control of the piston 24 is obtained through a duct 36 from an accumulator 37 for liquid under pressure. This accumulator 37 is fed through a duct 38 with a non-return valve 39 by the pump 30 (see FIG. 5). Consequently, even if the engine does not operate, energy will be available for the control of the wheel 6.

For forward driving, i.e. the steerable wheel 6 occupying the front position, the position 6A of this wheel and the position 32A of the driver's seat are to be preferred, whereas for backward driving the positions of the wheel 6 and the seat 32 shown in FIG. 2 are preferred, since in this case the wheel 6 is nearer the wheels 2 and 3 and the maneuverability, which is comparatively unfavorable in backward driving, is improved. The transition of the wheel 6 from the position shown in FIG. 1 into that shown in FIG. 2 and conversely is obtained by turning the shaft 9 (see FIG. 3) in the sleeve 10 through an angle of 180°. This rotation may be obtained readily by first moving the wheel into an oblique position, by subsequently causing the stud 11 to retreat from the recess concerned of the recesses 13 to 16, by driving subsequently the tractor forwards or backwards according to whether it is desired to move the wheel 6 to the rear or to the front, after which the wheel 6 will move in a manner such that the shaft 9 rotates in the sleeve 10. As soon as a small rotation has taken place, the liquid pressure in the cylinder 18 is cut off. This control may be effected from the seat 32. The stud 11 subsequently falls into a recess, which is shifted in position by 90° with respect to the recess in which the stud was first held. Then the piston 24 is caused to move out of its central position into the other direction, the stud 11 is again lifted and the tractor is driven again in the same direction and as soon as the shaft 9 rotates again in the sleeve 10 the stud 11 is again released, after which this stud falls into the recess 13 to 16 which is diametrically opposite the recess in which the stud 11 was first held, so that the desired rotation of the shaft 9 through 180° in the sleeve 10 is then achieved. Then the seat 32 can be turned through 180° about the shaft 33.

Instead of rotating the shaft 9 through half a revolution in the sleeve 10, the ring 10' together with the control-cylinder 23 may be caused to rotate through half a revolution relatively to the frame 1, as is shown by the variant in FIG. 4. In this case the cylinder 18' is not secured to the ring 10' but to the frame 1, while the cylinder 23' is not articulated to the frame 1 but is connected to the ring 10' in a pivotal manner or by means of an arm 40'. The piston rod 22' acts upon an arm 41', which is connected by sleeve 9a with the shaft 9', while the ring 10' can be fixed in four positions, which are determined by the positions of the four recesses 42' to 45', in each of which the stud 11' can fall. In this case the movement of the ring 10' may be coupled mechanically in an easy manner, for example by means of a chain and two sprockets of equal size, with the shaft 33', so that when the wheel 6' is turned also the seat is turned.

What I claim is:

1. An agricultural tractor comprising support means, two wheels on said support means at one end of the same, said wheels being spaced transversely of the direction of travel of the tractor, at least one steerable wheel at the other end of said support means and positioned substantially midway between the first said wheels, a single steering means operatively associated with said steerable wheel, means on said support means for supporting an operator in at least two different positions for operating the tractor by said single steering means in opposite directions of travel, power means on each of said two wheels for driving the same and means operatively associated with said steerable wheel for adjusting the steerable wheel from a first to a second position relative to the first said wheels for changing the wheel base of the tractor, said means defining a vertical axis about which the steerable wheel is rotatable over an angle of 180° from said first position into said second position, said vertical axis being displaced from the vertical axis through the center of the steerable wheel.

2. An agricultural tractor comprising support means, two wheels on said support means at one end of the same, said wheels being spaced transversely of the direction of travel of the tractor, at least one steerable wheel at the other end of said support means and positioned substantially midway between the first said wheels, a single steering means operatively associated with said steerable wheel, means on said support means for supporting an operator in at least two different positions for operating the tractor by said single steering means in opposite directions of travel, power means on each of said two wheels for driving the same and means operatively associated with said steerable wheel for adjusting the position thereof relative to the first said wheels for changing the wheel base of the tractor; the latter said means comprising a collar coupled to said support means and rotatable about a substantially vertical axis, a shaft rotatable in said collar, means for selectively locking the shaft to said collar, a horizontal axle supporting said steerable wheel for rotation and means connecting said axle to said shaft and spacing said axle from said axis, said collar being coupled to said steering means for rotation thereby.

3. An agricultural tractor comprising support means, two wheels on said support means at one end of the same, said wheels being spaced transversely of the direction of travel of the tractor, at least one steerable wheel at the other end of said support means and positioned substantially midway between the first said wheels, a single steering means operatively associated with said steerable wheel, means on said support means for supporting an operator in at least two different positions for operating the tractor by said single steering means in opposite directions of travel, power means on each of said two wheels for driving the same and means operatively associated with said steerable wheel for adjusting the position thereof relative to the first said wheels for changing the wheel base of the tractor; the latter said means comprising a rotatable collar on said support means and rotatable about a substantially vertical axis of rotation, means to lock said collar selectively against rotation, a shaft rotatable in said collar, a horizontal axle supporting said steerable wheel for rotation, and means connecting said axle to said shaft and spacing the axle from said axis, said steering means including means supported on said collar and connected to said shaft for rotating the latter relative to said collar.

4. An agricultural tractor adapted for travelling in opposite directions and comprising support means, two wheels on said support means at one end of the same, said wheels being spaced transversely of said directions of travel and having a fixed position with respect to said support means, at least one steerable wheel at the other end of said support means and positioned substantially midway between the first said wheels, a horizontal axle coupled to said support means, said horizontal axle supporting said steerable wheel for free rotation, a single steering means operatively associated with said steerable wheel, means on said support means for supporting an operator in at least two different positions for operating the tractor by said single steering means in said opposite directions of travel, power means on each of said two wheels for driving the same in said opposite directions, said tractor further comprising a vertical axle connecting said horizontal axle to said steering means for rotation about a substantially vertical axis, said vertical axle defining spaced grooves, and hydraulic locking means for locking the axle in determinable relation to said steering means in positions angularly displaced by about 180°, said locking means comprising a pin insertable in said grooves, a piston coupled to said pin and a cylinder accommodating and controlling the movement of said piston and thereby of said pin.

5. A tractor as claimed in claim 4 wherein said steering means comprises piston and cylinder members in operative association, one of said members being coupled to said support means and the other member being coupled to said vertical axle for rotation of the same.

6. An agricultural tractor adapted for travelling in opposite directions and comprising support means, two wheels on said support means at one end of the same, said wheels being spaced transversely of said directions of travel and having a fixed position with respect to said support means, at least one steerable wheel at the other end of said support means and positioned substantially midway between the first said wheels, a horizontal axle coupled to said support means, said horizontal axle supporting said steerable wheel for free rotation, a single steering means operatively associated with said steerable wheel, an operator's seat, which is rotatable through about 180° on said support means for supporting an operator in at least two different positions for operating the tractor by said single steering means in said opposite directions of travel, a control lever for actuating said single steering means, said control lever being attached to said operator's seat, and power means on said two wheels for driving the same in said opposite directions.

References Cited in the file of this patent

UNITED STATES PATENTS

| | | |
|---|---|---|
| 1,168,956 | Nelson | Jan. 18, 1916 |
| 1,395,257 | Clark | Nov. 1, 1921 |
| 1,657,412 | Schneider | Jan. 24, 1928 |
| 2,384,890 | Coldwell | Sept. 18, 1945 |
| 2,422,813 | Walch | June 24, 1947 |
| 2,559,379 | Szekely | July 3, 1951 |
| 2,586,273 | Steven | Feb. 19, 1952 |
| 2,598,865 | Turner | June 3, 1952 |
| 2,644,540 | Balzer | July 7, 1953 |
| 2,666,491 | Johnson | Jan. 19, 1954 |
| 2,674,464 | Peterson | Apr. 6, 1954 |
| 2,745,506 | McCallum | May 15, 1956 |
| 2,759,687 | Hogan | Aug. 21, 1956 |
| 2,762,446 | Worthington | Sept. 11, 1956 |
| 2,820,644 | Smith | Jan. 21, 1958 |